Patented Oct. 11, 1932

1,882,560

UNITED STATES PATENT OFFICE

EUGEN GLIETENBERG AND WILHELM NEELMEIER, OF LEVERKUSEN-ON-THE-RHINE, AND JOSEF HALLER, OF WIESDORF-ON-THE-RHINE, GERMANY, ASSIGNORS TO GENERAL ANILINE WORKS, INC., OF NEW YORK, N. Y., A CORPORATION OF DELAWARE

MANUFACTURE OF WATER-INSOLUBLE AZO DYESTUFFS

No Drawing. Application filed April 25, 1929, Serial No. 358,152, and in Germany May 7, 1928.

The present invention relates to a process of preparing water-insoluble azo dyestuffs.

According to this invention, water-insoluble azodyestuffs are prepared either in substance, or on the fiber according to the dyeing or printing process by using in said processes the condensation products of diazocompounds, tetrazocompounds or diazo-azocompounds, containing no sulfonic acid and no carboxylic acid groups, with certain secondary amines. These condensation products used for the purpose of our invention may be represented by the general formula:

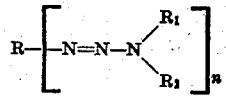

wherein R stands for the residue of a diazotization component suitable for producing azodyestuffs, which may be substituted except by a sulfonic acid- or carboxylic acid group, and which may contain one or more azo groups, $R_1$ and $R_2$ stand either for the same or different residues of the group comprising alkyl, phenyl and benzyl groups, at least one of the residues $R_1$ and $R_2$ being substituted by a substituent inducing solubility in water, such as the -COOH-, -$SO_3H$- or -$O.SO_2H$-groups, and $n$ stands for one of the numbers one and two.

These condensation products are obtainable by diazotizing or tetrazotizing in the usual manner with hydrochloric acid or sulfuric acid and sodium nitrite an amino- or diamino-compound containing no sulfonic acid and no carboxylic acid group, but which may contain an azo group, and introducing slowly this diazo solution into an aqueous solution of an about equivalent quantity of a secondary amine of the general formula:

wherein $R_1$ and $R_2$ mean the same as above, said solution containing an acid binding agent, such as sodium or potassium carbonate or bicarbonate, favorably at temperatures between about 0° C. and +10° C. The new condensation products separate in a crystalline form during the reaction, or the separation is completed by salting out the new products. They are generally yellowish to brownish colored, crystallizing substances, and possess the important property of undergoing no decomposition in neutral or alkaline aqueous solution, while they are decomposed quantitatively into their components by the action of diluted mineral acids or acid mineral acid salts or strong organic acids, such as formic acid, acetic acid or oxalic acid.

According to the invention, azo dyestuffs in substance are prepared by dissolving a condensation product of the above identified general formula in water and adding thereto an about equivalent quantity of any coupling component suitable for producing azodyestuffs containing no sulfonic acid and no corboxylic acid group in an aqueous solution. Then the mixture is acidified by a strong organic acid, such as formic acid, acetic acid or oxalic acid, until a 5-10% acid solution has formed. The formation of the dyestuff begins immediately and can be accelerated by slowly heating, say to about 50-60° C.

If the solution is acidified with a mineral acid or an acid mineral acid salt, for example hydrochloric acid or sodium bisulfate, the decomposition of the condensation product proceeds more quickly; but in this case the free mineral acid must be neutralized, for example by the addition of soda or sodium acetate for effecting the coupling.

Otherwise the dyestuff may be prepared by introducing the aqueous solution of a coupling component containing no sulfonic acid and no carboxylic acid group into the aqueous solution of the condensation product to which an acid previously has been added; this method of preparing the dyestuff is equivalent to that described above.

In preparing the dyestuff on the fiber, especially on cotton, the material to be dyed is impregnated with a grounding liquor containing a coupling component which is not substituted by a carboxylic or sulfonic acid group, for example, a 2.3-hydroxy-naphthoic acid arylide or a naphthol, centrifuged, wrung and developed for about half an hour in a diazo bath, rinsed, soaped at the boil, rinsed and dried.

For dyeing 50 grams of cotton, the grounding liquor is prepared by dissolving together about ½ gram to about 5 grams of the coupling component, about 1 to about 10 ccm of caustic soda lye of 34° Bé., and about 1 to about 10 ccm of Turkey red oil of 50% strength and making up the whole with water to 1 liter.

The developing bath is prepared by dissolving about 3 to about 10 grams of the above identified condensation product in 1 liter of water and adding thereto the necessary quantity of an acid, preferably formic acid or acetic acid, generally 20 to 50 ccm of the concentrated acid being sufficient for 1 liter. Into this solution there is introduced the cotton impregnated with the coupling component, the bath is advantageously slowly heated to about 50–60° C., and when the diazo compound can no more be detected, the cotton is rinsed, soaped at the boil, rinsed and dried.

Our new process is favorably used for preparing dyeings on the fiber according to the printing process. The printing paste used for this purpose is prepared by mixing together about equivalent quantities of a condensation product as above identified and a coupling component, containing no sulfonic and no carboxylic acid group, especially a 2.3-hydroxy-naphthoic acid arylide, adding to the mixture caustic soda lye in a quantity sufficient for dissolving the components and making up the mixture to a printing paste in the usual manner by adding thereto a thickening agent, such as starch or gum tragacanth and the necessary quantity of water, and if desired, Turkey red oil. The fiber is printed with this printing paste in the usual manner, then it is dried and treated for a short time, say for about 20 seconds, in a bath containing an acid and if desired a suitable salt, such as Glauber's salt, sodium chloride or the like. Generally we carry out the developing process by passing the printed cotton through a bath containing about 5–10% of formic acid or acetic acid and 10% of Glauber's salt at an elevated temperature, say at temperatures between 50 and 90° C.

The invention is illustrated by the following examples, but is not restricted thereto:

*Example 1.*—5.9 grams of the condensation product obtained from diazotized 3-nitro-4-amino-1-methylbenzene and sodium 2-ethyl-amino-1-methylbenzene-4-sulfonate are dissolved in warm water and an alkaline solution of 3 grams of aceto acetic acid anilide is added. On the gradual addition of acetic acid formation of the dyestuff occurs, which can be accelerated by raising the temperature. When the condensation product can no longer be detected the yellow dyestuff of the formula:

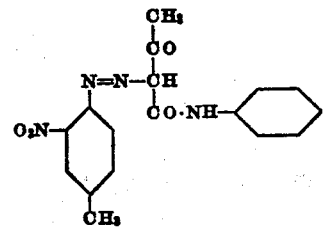

which separates is filtered off, washed and dried.

*Example 2.*—4 grams of the condensation product obtained from diazotized 5-chloro-2-aminotoluene and potassium 2-ethyl-amino-1-methylbenzene-4-sulfonate are dissolved in a little hot water and the volume of the solution is made up to one litre by the addition of cold water. 20 grams of acetic acid and 5 grams of alum are then added and cotton previously impregnated in the customary manner with 2.3-hydroxy-naphthoic acid-4'-chloro-2'-toludide is developed with this solution. Rapid formation of the dyestuff of the formula:

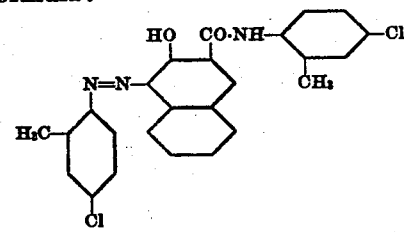

on the fiber and the reaction is completed by gradually raising the temperature to about 60° C. After rinsing and soaping at the boiling point a clear red is obtained.

*Example 3.*—6 grams of the condensation product obtained from diazotized para aminoazotoluene and one molecule of potassium dibenzylaminodisulfonate are dissolved in 1000 ccm of water at ordinary temperature and 30 grams of acetic acid are added to the clear solution. At room temperature the splitting up of the diazo compound only occurs slowly. A skein of cotton previously impregnated with 2.3-hydroxynaphthoic acid α-naphthylamide is then introduced into the solution and heated to about 50–60° C. whilst continuously moving the skein. When the decomposable diazo compound can no longer be detected in the solution the skein is rinsed and soaped. The cotton is thus dyed a deep Bordeaux red with the dyestuff of the formula:

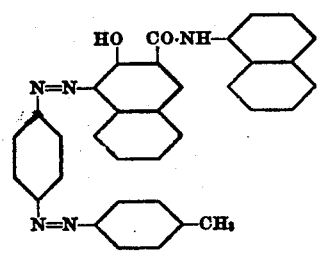

The splitting up of the diazo condensation product can also be carried out with smaller quantities of organic acids provided it takes place in the presence of only a little water.

By replacing the condensation product in this example by the product of the action of one molecule of tetrazotized dianisidine and two molecules of potassium N-ethyl-o-toluidine-p-sulfonate, a dark blue is obtained.

*Example 4.*—A solution of the condensation product obtained from diazotized 4-chloro-2-amino-1-methylbenzene and sarcosine is mixed in the molecular proportion with a solution of 2.3-hydroxynaphthoic acid-2'-toluidide in the calculated quantity of dilute caustic soda, and the whole is evaporated to dryness under reduced pressure. 15 grams of the pale yellowish colored powder thus obtained are made into a paste with a little Turkey red oil and mixed with starch tragacanth thickening agent and water to the extent that the total weight of the finished printing paste amounts to 100 grams. The material is printed, dried, steamed and developed at about 80° C. in a bath containing 50 grams of formic acid and 100 grams of sodium sulfate per liter. In this manner a clear red is obtained with the dyestuff of the formula:

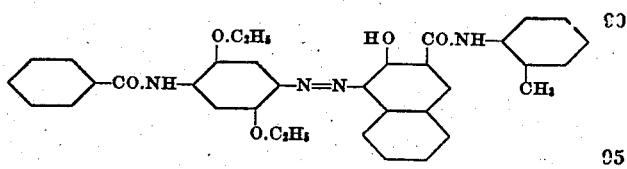

*Example 5.*—5.6 grams of potassium 2-methyl-4-nitrobenzene-azo-N-ethylaminobenzene-3'-sulfonate are finely powdered together with 6 grams of the sodium salt of 2.3-hydroxynaphthoic acid-2'-toluidide and the mixture is worked up with a neutral thickener to 100 grams of printing paste. The goods are printed, dried and the dyeing is developed in a hot bath containing per liter about 30 grams of acetic acid. A full bluish red is obtained with the dyestuff of the formula:

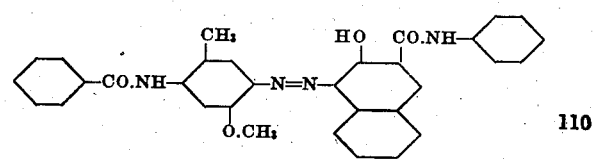

Instead of the compounds mentioned, other coupling components commonly used for the manufacture of azo dyestuffs can be employed, such as for example, β-naphthol-α-naphthol derivatives coupling in the ortho-position, pyrazolones, diacylacetic acid arylides, 1:3-dihydroxyquinolines and the like.

*Example 6.*—1/200 mol of the diazoamino compound, obtainable from diazotized 1-amino-2.5-diethoxy-4-benzoylaminobenzene and sarcosine is dissolved with 1/200 mol of 2.3-hydroxynaphthoic acid-2'-toluidide in about 20 ccm of water with about 1.5 ccm of caustic soda (30%) and 3 ccm of Turkey red oil and this solution is made up to 100 grams with a tragacanth thickening agent. This printing paste is then printed on to the fabric, dried and developed by once passing through approximately 5% acetic acid at about 80° C. A blue is obtained which by subsequent soaping at the boil acquires a beautiful greenish shade. The dyestuff has the following formula:

*Example 7.*—On taking 1/200 mol of the diazoamino compound, obtainable from diazotized 1-amino-4-benzoylamino-2-methoxy-5-methylbenzene and sarcosine and 1/200 mol of 2.3-hydroxy naphthoic acid anilide and proceeding as described in Example 6, a clear bluish violet is obtained with the dyestuff of the formula:

*Example 8.*—50 grams of the condensation product, obtainable by further diazotizing the dyestuff p-nitrobenzene-azo-amino-hydroquinone-dimethylether and coupling in alkaline solution with sarcosine, are mixed in approximately molecular proportions with 2.3-hydroxynaphthoylamino-hydroquinone-dimethylether. 35 grams of caustic soda 38° Bé. and 50 grams of Turkey red oil are added and a printing paste (1000 grams) is made up with the necessary quantity of thickening agent and water. After the printing the fabric is hung or steamed and the dyeing developed by treatment with a dilute organic acid, such as for example, 5% acetic acid or formic acid. The fabric is then rinsed and soaped at the boil. In this manner a deep black is obtained with the dyestuff of the formula:

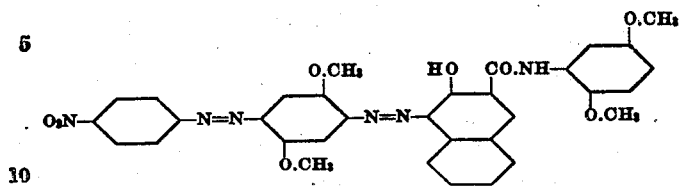

*Example 9.*—40 grams of the condensation product obtainable from one mol of tetrazotized dianisidine and two mols of the sodium salt of ethyl-p-toluidine sulfonic acid are made into a paste with 38 grams of 2.3-hydroxynaphthyl-α-naphthylamine, 40 grams of caustic soda, 40 grams of Turkey red oil and a little water, and the whole made up to 1000 grams of printing paste by stirring in the thickener. The printing carried out as already described yields a powerful blue. The dyestuff has the following formula:

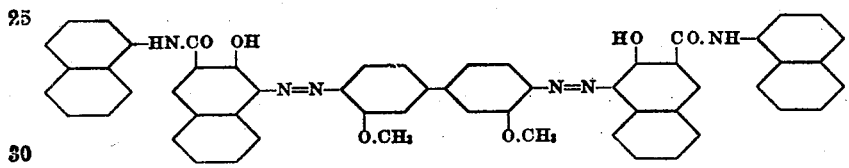

*Example 10.*—By dissolving a mixture of 1/100 mol of the diazoamino compound obtainable from diazotized 4-chloro-2-toluidine and sarcosine and 1/100 mol of the diaceto acetic acid toluidide by the addition of a little caustic soda lye and Turkey red oil in about 200 ccm. of water and working after the addition of the thickener in an analogous manner to that described in the Examples 6 and 7, a clear yellow is obtained with the dyestuff of the formula:

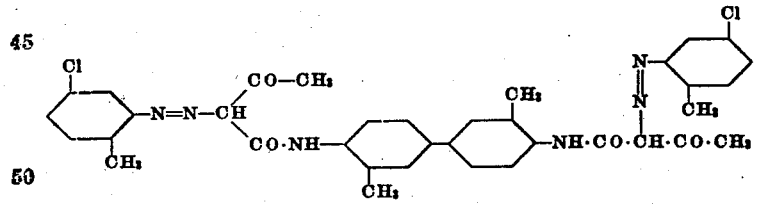

*Example 11.*—30 grams of the condensation product prepared from tetrazotized dianisidine and 2 molecules of monoethyl-4-toluidine-3-sulfonic acid are mixed with 30 grams of 2.3-hydroxy naphthoic acid-α-naphthylamine and made up into a paste with 40 grams of caustic soda, 40 grams of highly sulfurized castor oil, 100 grams of water and 760 grams of a starch tragacanth thickening agent. With this paste cotton is printed in the usual manner, then the print is dried, steamed for about 2 minutes and developed for about 20 seconds in a bath of 80° C. containing 5% formic acid and 10% sodium formate. Then the cotton is rinsed, boiled at the soap, rinsed and dried. A powerful blue is obtained. The dyestuff is identical with that prepared according to Example 9.

We claim:

1. The process of preparing water-insoluble azo dyestuffs comprising reacting with an acid reacting compound of the group consisting of mineral acids, water-soluble acid mineral acid salts and strong organic acids, upon a mixture of any coupling component suitable for producing azodyestuffs containing no sulfonic acid and no carboxylic acid group, and a compound of the following formula:

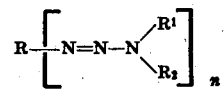

wherein R stands for the residue of a diazotization component suitable for producing azodyestuffs containing no sulfonic acid and no carboxylic acid group and which may contain an azo group, $R_1$ and $R_2$ stand for substituents of the group consisting of alkyl, the phenyl and benzyl series, at least one of which is substituted by a substituent of the group consisting of the -COOH-, -SO$_3$H- and -O.SO$_2$H- groups, and $n$ stands for one of the numbers one and two.

2. The process of preparing water-insoluble azo dyestuffs comprising reacting with an acid reacting compound of the group consisting of mineral acids, water-soluble acid mineral acid salts and strong organic acids, upon a mixture of any coupling component suitable for producing azodyestuffs containing no sulfonic acid and no carboxylic acid group and a compound of the following formula:

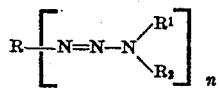

wherein R stands for the residue of a diazotization component suitable for producing azodyestuffs containing no sulfonic acid and no carboxylic acid group and which may contain an azo group, $R_1$ and $R_2$ stand for alkyl groups, at least one of which is substituted by a carboxylic acid group, and $n$ stands for one of the numbers one and two.

3. The process of preparing water-insoluble azo dyestuffs comprising reacting with an acid reacting compound of the group consisting of mineral acids, water-soluble acid mineral acid salts and strong organic acids, upon a mixture of any coupling component suitable for producing azodyestuffs containing no sulfonic acid and no carboxylic acid group, and a compound of the following formula:

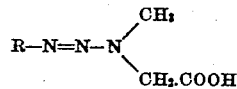

wherein R stands for the residue of a diazotization component suitable for producing azodyestuffs containing no sulfonic acid and no carboxylic acid group and which may contain an azo group.

In testimony whereof we have hereunto set our hands.

EUGEN GLIETENBERG.
WILHELM NEELMEIER.
JOSEF HALLER.